(12) United States Patent
Wittkowski et al.

(10) Patent No.: US 11,136,056 B2
(45) Date of Patent: Oct. 5, 2021

(54) PLANAR FLEXIBLE CARRIER FOR USE IN STEERING WHEEL HEATING AND/OR SENSING

(71) Applicant: IEE INTERNATIONAL ELECTRONICS & ENGINEERING S.A., Echternach (LU)

(72) Inventors: Thomas Wittkowski, Abentheuer (DE); Matthias Massing, Knoz (DE); Michael Olk, Welschbillig-Trag (DE); Baptiste Fagart, Longwv (FR)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 810 days.

(21) Appl. No.: 15/536,529

(22) PCT Filed: Dec. 15, 2015

(86) PCT No.: PCT/EP2015/079737
§ 371 (c)(1),
(2) Date: Jun. 15, 2017

(87) PCT Pub. No.: WO2016/096815
PCT Pub. Date: Jun. 23, 2016

(65) Prior Publication Data
US 2017/0355391 A1 Dec. 14, 2017

(30) Foreign Application Priority Data
Dec. 15, 2014 (LU) .......................................... 92616

(51) Int. Cl.
*H05B 3/54* (2006.01)
*B62D 1/04* (2006.01)
*B62D 1/06* (2006.01)

(52) U.S. Cl.
CPC ............. *B62D 1/046* (2013.01); *B62D 1/065* (2013.01); *H05B 3/54* (2013.01)

(58) Field of Classification Search
CPC .......... B62D 1/046; B62D 1/065; B62D 1/06; H05B 2203/013; H05B 2203/017; H05B 3/34; H05B 3/54
(Continued)

(56) References Cited

U.S. PATENT DOCUMENTS 6,727,467 B1 * 4/2004 Hadzizukic ............ B62D 1/065
219/204
6,838,647 B2 1/2005 Nägele
(Continued)

FOREIGN PATENT DOCUMENTS

CN 1622893 A 6/2005
DE 3837743 A1 5/1990
(Continued)

OTHER PUBLICATIONS

Bourne ("Arc Length of a Curve using Integration") (Year: 2011).*
(Continued)

*Primary Examiner* — Erin E McGrath
*Assistant Examiner* — Tiffany T Tran
(74) *Attorney, Agent, or Firm* — Reising Ethington P.C.

(57) ABSTRACT

A planar carrier for mounting on a rim of a steering wheel without wrinkles, the planar carrier including a portion of planar flexible foil of roughly rectangular shape having two longitudinal sides and two lateral sides, wherein the length B of the lateral sides is 0.96 to 1.00 times the perimeter of the rim, and wherein N cut-outs per unit length are provided on each of the longitudinal sides. The cut-outs of one side are located in a staggered fashion relative to opposing cut-out portions on the opposite side. The optimum shape and size of the cut-outs may be determined as described. The
(Continued)

planar carrier may be implemented as a heat carrier, a heating device and/or a sensing device.

19 Claims, 4 Drawing Sheets

(58) Field of Classification Search
USPC .................. 219/528, 549, 553, 202, 204
See application file for complete search history.

(56) References Cited

U.S. PATENT DOCUMENTS

| | | | | |
|---|---|---|---|---|
| 2002/0033389 A1* | 3/2002 | Sugiyama | .............. | B62D 1/065 |
| | | | | 219/204 |
| 2004/0226400 A1* | 11/2004 | Proudfit | .................. | B32B 27/30 |
| | | | | 74/558 |
| 2006/0096409 A1 | 5/2006 | Weiss et al. | | |

| | | | |
|---|---|---|---|
| 2015/0369633 A1* | 12/2015 | Karasawa | .............. B62D 1/046 |
| | | | 324/686 |
| 2016/0009310 A1* | 1/2016 | Seki | ........................ H05B 3/34 |
| | | | 219/204 |

FOREIGN PATENT DOCUMENTS

| | | |
|---|---|---|
| DE | 10126134 A1 | 12/2002 |
| DE | 102004053634 A1 | 5/2006 |
| JP | S61218475 A | 9/1986 |
| WO | WO2010028155 A2 | 3/2010 |
| WO | WO2014123222 A1 | 2/2017 |

OTHER PUBLICATIONS

International Search Report for International Application No. PCT/EP2015/079737, dated Mar. 15, 2016, 3 pages.
Written Opinion for International Application No. PCT/EP2015/079737, dated Mar. 15, 2016, 6 pages.
Chinese Office Action corresponding to application No. 201580068486.5, dated Nov. 2, 2018, 11 pages.

* cited by examiner

PLANAR FLEXIBLE CARRIER FOR USE IN STEERING WHEEL HEATING AND/OR SENSING

TECHNICAL FIELD

The present invention generally relates to providing steering wheels with an appropriate heating and/or sensing device, in particular vehicle steering wheels in the automotive field.

BACKGROUND ART

Today's steering wheel heaters frequently comprise wires in serial electrical connection. Often a couple of such wires (typically 2 to 6) are connected in parallel. There are different ways of wire integration in the steering wheel heater: Wires may be wound around the rim, they may be loosely attached to the rim, they may be supported by another carrier on which they are fixed in a characteristic pattern by means of stitching or gluing, e.g., or wires may be integrated in a fabric which is wrapped around the rim.

In these steering wheel heaters the wire resistance per length unit needs to be properly adjusted in order to match the desired heating power and the wire needs to be laid appropriately to enable homogeneous heating of the trim. Typical wire materials are metals (elemental or alloys) as well as carbon fibers. Typical metals are copper or iron based, alloys may comprise zinc, nickel, tin, chrome, and other metals. Metals may be enameled or plated with silver, e.g., in order to prevent corrosion.

Currently, planar flexible heating devices are not found in the market for steering wheel heaters, mainly because it was not possible to integrate a heating element in such a way that the trim is heated on its complete area and that its power/temperature distribution is sufficiently high and uniform.

Although some solutions using a foil carrier have been proposed as a steering wheel heater, the area of their heating devices is chosen to be distinctly smaller than that of the rim. They may thus be attached without wrinkles, but the heat is not distributed evenly over the whole surface of the steering wheel. As a consequence, to date there seems to be no optimum solution to address all of the following criteria: tactile smoothness (no wires, no wrinkles), sufficiently high heater power, thermal evenness across the trim surface and ease of installation. It seems that only if (most of) these aspects would be carefully considered it could be ensured that a maximum fraction of the steering wheel trim area is heated at sufficiently high power level without compromising on the tactile aspect.

SUMMARY

It is an object of the present invention to provide a solution which allows covering nearly the entire surface of a steering wheel, while providing a smooth touch and preferably an even distribution of the heat over the whole surface.

In order to overcome the above-mentioned problems, the present invention in at least some embodiments provides a planar carrier for mounting on a rim of a steering wheel without wrinkles, the planar carrier comprising a portion of planar flexible foil of roughly rectangular shape having two longitudinal sides and two lateral sides, wherein the length B of the lateral sides is 0.96 to 1.00 times, preferably 0.985 to 0.999 times the perimeter of the rim, wherein N cut-outs per unit length are provided on each of the longitudinal sides, the cut-outs of one side being located in a staggered fashion relative to opposing cut-outs on the opposite side and wherein the width of each cut-out as a function of the arc length l of the rim, w(l), is $$w(l) = \frac{\varepsilon(l)}{N} \qquad \text{Eq. 1}$$

wherein $\varepsilon(l)$ is the material surplus as a function of the arc length l and the arc length l of the rim is measured from the middle or center (B/2) of the portion of rectangular flexible foil in perpendicular direction to the longitudinal side, N being chosen between 10 and 50 m$^{-1}$, preferably between 20 and 40 m$^{-1}$,
wherein arc length l of the rim as a function of the radial coordinate r is $$l(r) = \int_{r}^{r_1+r_{2r}} \sqrt{\left(\frac{df(r)}{dr}\right)^2 + 1}\, dr \qquad \text{Eq. 2}$$

wherein $r_1$ is the radius of the steering wheel, $r_{2r}$ is the radius of the rim collinear with $r_1$, f(r) is a function describing the cross-sectional shape of the rim, and
wherein the surplus of the planar flexible foil in the planar carrier as a function of the radial coordinate r is $$\varepsilon(r) = \frac{\Delta l(r)}{l} = -1 + \frac{r}{r_1 + r_{2r}}. \qquad \text{Eq. 3}$$

The main advantage of the present solution is that it now becomes possible to provide a carrier element which fits a given rim shape as close as possible, even with more complex cross-sectional shapes, such as elliptic or even asymmetrical shapes. For asymmetrical shapes, the above calculations only need to be done for each side by replacing the appropriate shape function f(r) in Eq. 2.

Furthermore, due to the number of cuts per unit length N and the staggered location of opposing cuts, the carrier presents both an increased continuous surface area and an increased cross-sectional area of the carrier, which makes it particularly suitable as a heat conducting carrier, as a heating/sensing element carrier or as a combined heat conducting and heating (and/or sensing) element carrier.

Although, the carrier may be used even for complex cross-sectional shapes of the rim, some embodiments of the present invention also provide a planar carrier for a rim having a circular cross-section. In such cases, the width of each cut-out as a function of the arc length l of the rim, w(l), is as follows:

$$w(l) = \left(-1 + \frac{r_1 + r_{2r}\cos\left[\frac{l}{r_{2r}}\right]}{r_1 + r_{2r}}\right) \cdot N^{-1}. \qquad \text{Eq. 4}$$

wherein the definition of the terms and factors are those provided above. It is understood that for a circular cross-section both halves of the planar carrier are identical except for the staggered location of the cut-outs.

Numerous rims on the market exhibit so-called finger portions. These are generally periodic undulations of the height profile of the rim, typically applied on the side of the rim being directed towards the steering wheel shaft or on the side facing away from the driver. A typical wavelength of the undulations is between 20 and 40 mm. Generally, each finger portion comprises between 4 and 15 undulations in a rim section. Frequently, rims possess two or three finger portions separated by the spokes.

For rims with finger portions, the optimum shape gets a lot more complex. However, a more than acceptable compromise for this particular situation can be provided if the planar carrier further comprises a peculiarly shaped portion of planar flexible foil of roughly rectangular shape having two longitudinal sides and two lateral sides, wherein the cut-outs are enlarged relative to w(l) on one of the longitudinal sides, preferably by 5 to 25%. In practice, a carrier for such applications may thus comprise a plurality of portions with cut-outs widths as calculated according to the equations above and a plurality of portions with adapted cut-outs.

In some configurations of the finger portions, such as when the finger portions are located at the back of the rim (as seen from the driver), it may advantageous or necessary to (further) modify the design so as to relocate part of the indented structure of the carrier to the opposite side (those structures thus wrapping around the inner perimeter of the rim).

As an alternative or in addition for rims with finger portions, the planar carrier for a steering wheel is stretchable. In the context of the present invention "stretchable" shall mean that the operator may strain the heating element preferably by up to 5% by hand along its long side.

The cut-outs in the planar carrier are preferably up to the center line of the carrier in case of flexible planar carriers which are not (necessarily) stretchable. However, an offset A of the start of the cut-outs from the centerline may be acceptable or desirable for certain applications. In general such an offset A is less than 5%, preferably less than 3%, most preferably less than 2% of B. The advantage of choosing a certain offset A is that the continuous surface area and the cross-sectional area of the carrier is increased without significant effect on the appropriate conformation of the planar carrier on the rim.

In a still further advantageous aspect, the carrier is stretchable and this property is used to further enhance the shaping of a planar carrier of the present invention. Hence, the invention also concerns a stretchable planar carrier wherein the length of the planar carrier is chosen to be up to 5%, preferably at least 4%, more preferably between 1% and 3% shorter than the outer perimeter of the rim. As a particular advantage of such embodiments, the neutral point (point without strain when mounted on the rim) shifts along the width of the planar carrier. This neutral point can thus be used similar to offset A described above, which in turn allows having a larger area in the center of the carrier without cut-outs, thereby (further) increasing both the continuous surface area and the cross-sectional area of the carrier.

In a further aspect, the invention concerns a heat carrier comprising a planar carrier as described herein. The carrier may thus also be a carrier for heat that is transported within the carrier, in particular heat transport is facilitated in directions perpendicular to the surface normal. In this aspect, the planar carrier has good heat conducting properties and is used to evenly distribute the heat from a(n external) source through the cross-section of the carrier. At least some embodiments of the invention thus also provide for the use of a planar carrier as heat carrier for distributing heat over the entire rim of a steering wheel. Appropriate carrier material is characterized in such cases by high thermal conductivity; an example is metal foil, such as aluminum, copper, graphene sheeting, ceramic/polymer multilayer materials, and highly filled polymer foil. Typical fillers are metal oxides or hexagonal boron nitride.

In a further aspect, the invention relates to a heating and/or sensing device for a steering wheel, comprising a planar carrier as described herein and at least one heating element arranged on at least one side of said planar carrier. Preferably said at least one heating element comprises at least one serial or parallel type electrical heating circuit. In case the heating element comprises two or more electrical heating circuits each may be independently a serial or parallel electrical heating circuit. A combination of serial and parallel circuits may thus also be used on a same carrier if desired.

The heating and/or sensing device's electrical circuits may be made of any appropriate material. Preferably they comprise highly conductive materials selected from printed PTF silver, printed nanoparticulate silver and/or galvanic copper.

If necessary (e.g. if the carrier is made of electrically conductive material) or desired, the heating and/or sensing device further comprises one (or more) dielectric layer(s) between the planar carrier and the heating and/or sensing element.

In a still further aspect, at least some embodiments of the invention provide a method for producing a planar carrier for a steering wheel or a heat carrier as described herein, said method comprising the steps of (a) determining the outer diameter and the cross-sectional shape of a rim to be equipped with a planar carrier, (b) fixing the number of cut-outs per unit length N, preferably taking into account the periodicity of finger portions if any, (c) providing a planar flexible foil of sufficient size, (d) preparing a planar carrier for mounting on a rim of a steering comprising a portion of planar flexible foil of roughly rectangular shape and (e) providing said portion of planar flexible foil of roughly rectangular shape with cut-outs as defined herein.

The invention also relates to a method for producing a heating and/or sensing device for a steering wheel as described herein, said method comprising the steps of the method above, as well as the further step of arranging at least one heating and/or sensing element on at least one side of said planar carrier. This further step may be done at any time after step (c) of the above method, preferably said further step is done after step (c) and before step (d). Optionally, a further dielectric layer may be provided inbetween the carrier and the heating element.

In a further aspect, the invention contemplates the use of a planar carrier or of a heat carrier or of a heating and/or sensing device as described herein for optimum rim area coverage and conformance, wherein the coverage of the rim is at least 86% of the surface without wrinkles for steering wheels with finger portions and at least 96% of the surface without wrinkles for steering wheels without finger portions.

In a further aspect, the invention pertains to the use of a planar carrier or of a heat carrier or of a heating and/or sensing device as described herein for capacitive sensing of the presence of the driver's hand(s) on the steering wheel.

The steering wheel rim can be of any appropriate type and shape. Generally, the rim is composed of a molding blank comprising a light alloy (or steel or carbon fiber) skeleton and a soft polymer casing (typically made of PU) in which the skeleton is embedded. Typically the rim possesses circular shape and supported by two or three spokes. Not very common but also possible are monolithic rims.

The radial cross-section of the rim is typically circular or exhibits shapes that are approximately elliptical. However, the radial cross-section may adopt any shape that is technically reasonable.

The steering wheel's trim is the covering of the rim and is typically made of leather, artificial leather or other materials containing polymers or textiles and may be composed of several layers.

The term "planar" as used herein means that the lateral extensions of the carrier (i.e. width and length) are much greater than its thickness.

The term "flexible" means that the area moment of inertia of the carrier is low enough so that the carrier can be bent repeatedly around a one-dimensional edge of radius 2.5 mm or greater.

Hence, the planar carrier may be made of a material which is thin in the sense that its thickness is much smaller than its lateral dimensions. The material that can be used may be any appropriate material, such as any kind of polymer foil, preferably made of or comprising a polyester, such as e.g. polyethylene terephthalate (PET) and/or polyethylene naphthalate (PEN); any kind of textile such as non-woven, weave, knit fabric and/or spacer fabric, which optionally may be coated. Such a carrier may be composed of several layers comprising one or more of the above materials laminated against each other. The thickness of the carrier may vary between typically 25 μm for a polymer foil and a few millimeters for a spacer fabric.

BRIEF DESCRIPTION OF THE DRAWINGS

Preferred embodiments of the invention will now be described, by way of example, with reference to the accompanying drawings in which.

Further details and advantages of the present invention will be apparent from the following detailed description of several not limiting embodiments with reference to the attached drawings.

DETAILED DESCRIPTION

Basically, a maximum of covered area of the steering wheel's rim is a necessary condition for a maximum of the rim area to be heated because a heating circuit can be applied only in those regions where the carrier is not cut away.

Therefore, the invention in at least some embodiments provides a method to compute the optimum shape of a planar flexible carrier that is to be wrapped around a steering wheel's rim. The shape ensures that the rim area covered by the carrier is greater or equal 96% of the rim area for rims without a finger portion and greater or equal 86% for rims exhibiting finger portions.

Figure 1A:
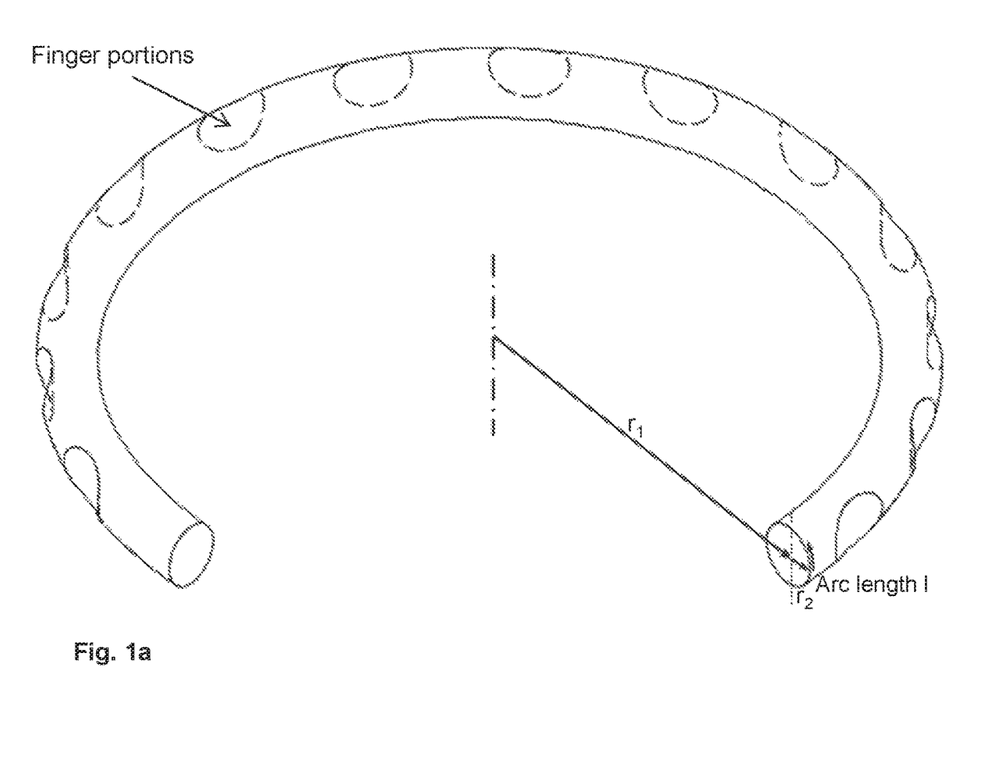
FIG. 1a is a perspective view of an example of a vehicle steering wheel.

Schematically, as illustrated in FIG. 1a, a steering wheel has a rim which in its simplest form may be described as a circular torus of radius $r_1$ with a circular rim (i.e. with circular radial cross-section). Commonly the cross-section of the rim may also be elliptical.

Figure 1B:
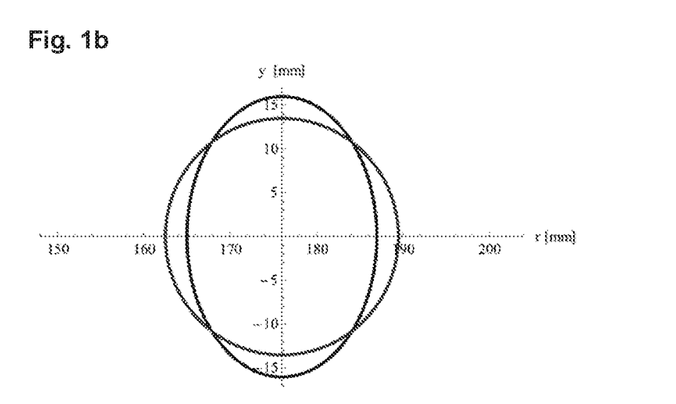
FIG. 1b is a graph showing two examples of rim cross-sections.

FIG. 1b shows a schematic cross-section of a circular and of an elliptic rim. With reference to FIGS. 1a and 1b, quantity r is measured from the center of the steering wheel shaft in the plane of the rim; here $r_1$=176 mm. Quantity y measures the extension of the rim perpendicular to the plane of the rim. This illustrative example shows symmetrical rim cross-sections, i.e. with mirror symmetry of the two halves.

For the ease of disclosure, the material surplus (i.e. the material that need to be cut out), as a function of the sheet coordinate is given for one half of the rim. It is self-understanding that in the case of a symmetrical rim cross-section both halves are characterized by the same material surplus, in case of a non-symmetrical rim cross-section the above Eq. 2 and 3 need to be evaluated for both halves of the rim independently.

In FIG. 1b, the steering wheel radius is $r_1$=176 mm. One curve shows a circular rim cross-section of radius $r_{2r}$=13.5 mm whereas the other curve shows an elliptical rim cross-section with the radial radius $r_{2r}$=11 mm and the perpendicular radius $r_{2p}$=16 mm.

The surplus of material in the planar carrier as a function of the radial coordinate r can be written as $$\varepsilon(r) = \frac{\Delta l(r)}{l} = -1 + \frac{r}{r_1 + r_{2r}}. \qquad \text{Eq. 3}$$

The arc length l of the rim as a function of the radial coordinate r writes $$l(r) = \int_r^{r_1+r_{2r}} \sqrt{\left(\frac{df(r)}{dr}\right)^2 + 1}\, dr \qquad \text{Eq. 2}$$

where f(r) is a function that describes the shape of the rim. The material surplus is obtained by building the inverse function $r(l) \equiv l^{-1}(r)$ of Eq. 2 and inserting r(l) in Eq. 3. One thus obtains the material surplus as a function of the arc length l.

For a circular rim cross-section the width of the cut-outs as a function of the arc length l is $$w(l) = \left(-1 + \frac{r_1 + r_{2r}\cos\left[\frac{l}{r_{2r}}\right]}{r_1 + r_{2r}}\right) \cdot N^{-1}. \qquad \text{Eq. 4}$$

Figure 2:
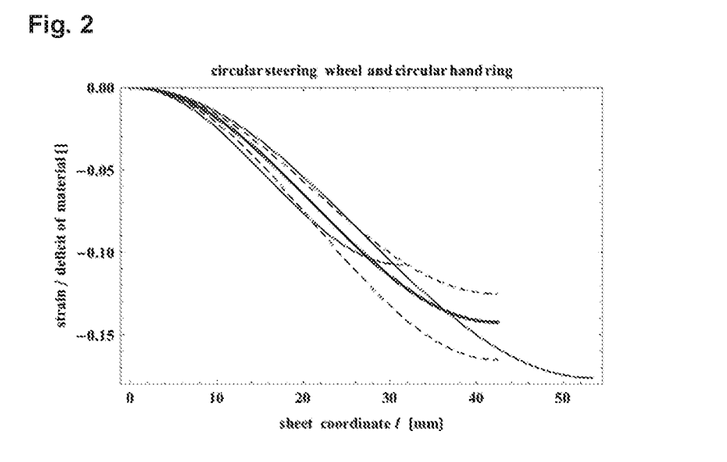
FIG. 2 is a graph representing the surplus of material (negative deficit) of a planar carrier as a function of the coordinate from the centerline of that carrier.

FIG. 2 presents the material surplus in a planar carrier wrapped around a rim of circular cross-section as a function of sheet (carrier) coordinate according to Eq. 1 to 3. Negative deficit of carrier material means surplus of carrier material. The full thick curve corresponds to steering wheel geometry $r_1$=176 mm and $r_a$=13.5 mm. The other thin full curves correspond to the same $r_1$=176 mm but different rim radii, $r_{2r}$=10 and 17 mm, respectively. The dashed curves show the material surplus for a rim radius of $r_{2r}$=13.5 mm but different steering wheel radii $r_1$=150 and 202 mm, respectively.

For an elliptical or for a free-shaped rim cross-section the inverse of Eq. 2 needs in general to be evaluated numerically. For the example of an elliptical cross-section of the rim with $r_1$=176 mm, $r_{2r}$=11 mm, and $r_{2p}$=16 mm one obtains the table of values Tab. 1 where the first column lists the respective coordinate on the planar carrier (arc length l) and the second column lists the strain, resp. the material surplus, in the carrier.

TABLE 1

Surplus of material, for different values of the respective coordinate on a planar carrier (arc length l).

| arc length l [mm] | surplus/deficit of material |
| --- | --- |
| 0. | 0. |
| 4.804 | −0.002674 |
| 6.766 | −0.005348 |
| 8.253 | −0.008021 |
| 9.492 | −0.0107 |
| 10.57 | −0.01337 |
| 11.54 | −0.01604 |
| 12.42 | −0.01872 |
| 13.23 | −0.02139 |
| 13.98 | −0.02406 |
| 14.69 | −0.02674 |
| 15.36 | −0.02941 |
| 16. | −0.03209 |
| 16.61 | −0.03476 |
| 17.19 | −0.03743 |
| 17.76 | −0.04011 |
| 18.31 | −0.04278 |
| 18.84 | −0.04545 |
| 19.36 | −0.04813 |
| 19.88 | −0.0508 |
| 20.39 | −0.05348 |
| 20.89 | −0.05615 |
| 21.39 | −0.05882 |
| 21.89 | −0.0615 |
| 22.39 | −0.06417 |
| 22.9 | −0.06684 |
| 23.41 | −0.06952 |
| 23.93 | −0.07219 |
| 24.47 | −0.07487 |
| 25.02 | −0.07754 |
| 25.58 | −0.08021 |
| 26.17 | −0.08289 |
| 26.78 | −0.08556 |
| 27.41 | −0.08824 |
| 28.08 | −0.09091 |
| 28.79 | −0.09358 |
| 29.55 | −0.09626 |
| 30.36 | −0.09893 |
| 31.24 | −0.1016 |
| 32.2 | −0.1043 |
| 33.28 | −0.107 |
| 34.52 | −0.1096 |
| 36.01 | −0.1123 |
| 37.97 | −0.115 |
| 42.78 | −0.1176 |

Figure 3:
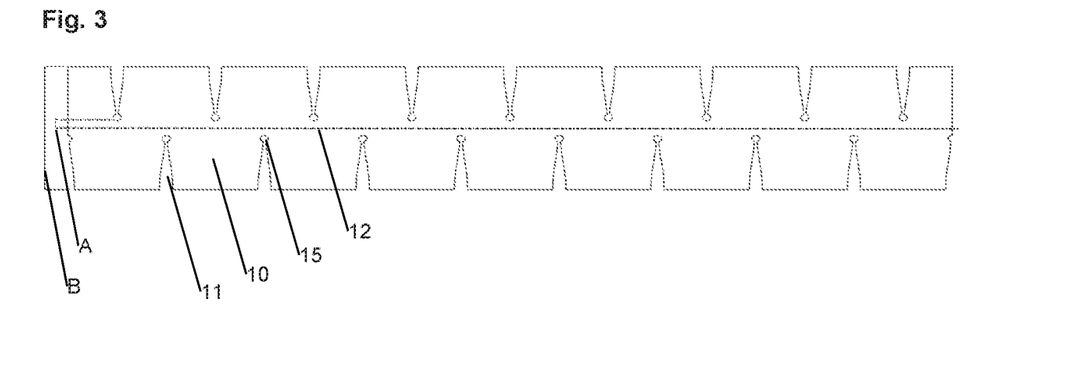
FIG. 3 is a schematic top view of an example of a planar carrier with a portion having cut-outs as defined herein.

FIG. 3 schematically shows the way in which a planar, flexible carrier 10 is cut in order to maximize the area coverage of the rim. The arc length 1 is measured in perpendicular direction from the dash-dotted center line 12 (l=0). Characteristic features of the design of FIG. 3 are i.) total width B of the planar flexible carrier 10 which equals the circumference of the rim, ii.) offset A by which the cuts 11 are away from the center line 12, iii.) crack stopper 15 of radius R which terminates the cuts 11 in order to avoid possible propagation of a crack during any production or operation phase of the heating element, iv.) length of the carrier, L, and v.) periodicity, i.e. the number of cuts 11 per length unit, N. The shape of the cuts 11 follows the function material surplus vs. arc length, ε(l), taking into account the periodicity of the cut-outs 11. The width of a cut-out 11 as a function of the arc length, w(1), then reads $$w(l) = \frac{\varepsilon(l)}{N} \qquad \text{Eq. 1}$$

thereby providing a precise technical instruction to build a carrier which maximizes the covered rim area.

Note that cut-outs on opposite sides of the center line are staggered. In this way the area available e.g. for applying heating or sensing circuits is maximized. In particular, even for an offset A=0 the staggered arrangement ensures that the carrier of the heating element is connected.

The periodicity, i.e. the number of cuts per length unit N, is typically chosen as small as possible in order to simplify the electrical design of the heating element and high enough to keep residual strains below a critical level that potentially could impede the conformance of the carrier around the rim. In case of presence of so-called finger portions on the rim, the periodicity N is preferably chosen such that it meets the periodicity of the undulations in the finger portion.

Figure 4:
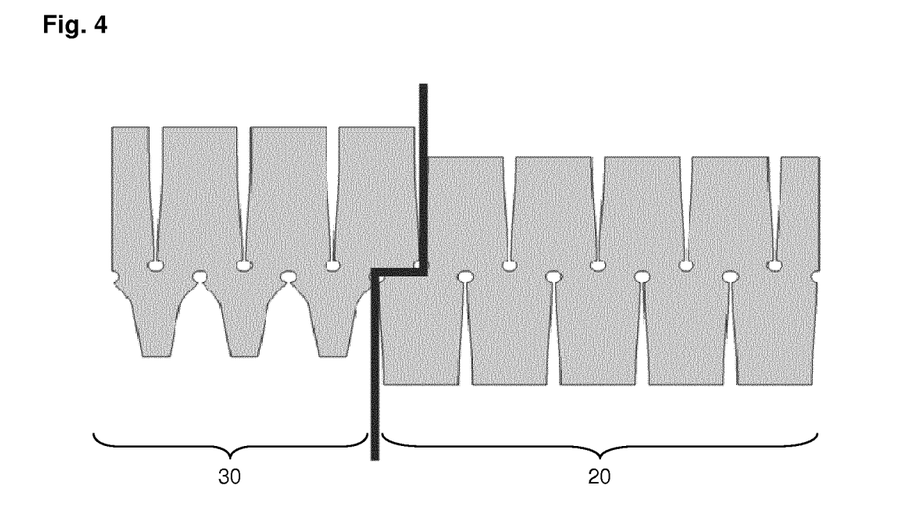
FIG. 4 is a schematic top view of a (part of a) further example of a planar carrier with two distinct portions having cut-outs as defined herein for use with a rim having finger portions.

The finger portions a priori impede a conformal attachment of a planar flexible carrier in this region of the rim. In order to maximize the rim area covered by the carrier also in the region of the finger portion the carrier design may be modified with respect to the regions without finger portion. FIG. 4 illustrates possible modifications: The righthand side of FIG. 4 shows an unmodified carrier portion as described above. The lefthand side shows a modified carrier portion which accounts for the difficult rim topography in the finger portion.

This modified design is achieved by virtually cutting the lower parts of the design (right side in FIG. 4), shifting these parts and attaching them at the upper ends of the carrier (left side in FIG. 4). Finally, the width of the finger-shaped parts may be reduced in order to achieve an optimal conformance of these parts in the valleys of the finger portion (see left side in FIG. 4).

In other words, for finger portions on the back side of the rim, the technical construction preferably foresees that with respect to the symmetry line (which is to be applied at the outer perimeter of the rim) one side of the carrier may be longer than B/2 and the other side shorter than B/2. FIG. 4 exemplifies a schematic procedure: on the left side of FIG. 4 the carrier above the center line possesses a width B/2+d, the carrier width below the symmetry line is B/2 d. So, in general the total width of the carrier in a carrier portion with finger portions remains B, although other values may be appropriate as long as the attachment to the rim can be made without wrinkles.

Figure 5:
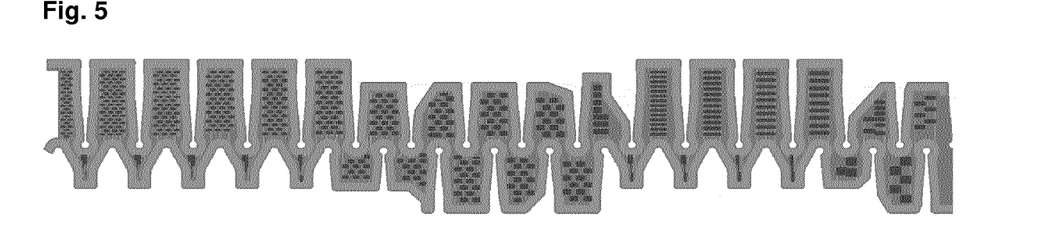
FIG. 5 is a top view of an example of a heating device with a parallel heating circuit.

In practice, on a number of rims there are regions (portions) with finger portions and regions without finger portions. In FIG. 5 the center of the carrier shows a region without finger portion whereas finger portions are neighbored to the left and the right. In FIG. 5 all carrier portions themselves possess the width B but it is seen that the overall rectangular area of the complete carrier foil (comprising regions with and without finger portions) is greater than B×L. It is (B+d)×L. In the example shown in FIG. 5 or 6 d=B/6 so that the rectangular area of the carrier was 7B/6×L. Generally, typical values for d are between B/10 and B/3.

For manufacturing reasons it may be advantageous to take into account some additional clearance. So one may wish to slightly increase the width compared to Eq. 1 by a small, constant value and one may wish to slightly reduce the width B of the heater element. Typically, such clearance can be chosen smaller than 0.5 mm.

Following the above instructions yields a planar flexible carrier that covers at least 96% of the surface area of the rim for rims without finger portions and at least 86% for rims that comprise finger portions. When attached to the rim the so designed carrier conforms to the shape of the rim. Using the planar, flexible carrier as support in particular for electrical heating circuits requires the maximum coverage of the rim. This is for two reasons: 1.) In order to achieve high uniformity of the temperature distribution on the outside of the steering wheel trim it is advantageous if the heat is also generated in a uniform manner. 2.) In order to achieve a fast heating up of the steering wheel sufficiently high power of the heating element is demanded. High power can only be achieved if the area available for applying heating circuits is sufficiently large. This is the case if the maximum of the rim surface area can be covered with the carrier.

Below are described some embodiments intended to further illustrate different aspects of the invention. They should not be construed to unduly limit the invention in any way.

Embodiment 1: Two Heating Elements Comprising a Parallel Heating Circuit

A planar, flexible carrier which covers a maximum of the rim surface area supports a parallel electrical heating circuit and so constitutes a heating element. Two of these heating elements are attached on the steering wheel rim so that their contacted sides abut to each other and contacts of the same electrical potential are also abutting. Optionally the electrodes of the same electrical potential are contacted additionally at the ends of the two heaters in order to further homogenize the power distribution between the two heating elements. (If both heating elements would be exactly identical the electric current flowing through the latter contacts would be zero.)

The embodiment refers to a steering wheel comprising three finger portions and a steering wheel rim of approximately elliptical cross-section with dimensions $r_1=176$ mm, $r_{2r}=11$ mm, and $r_{2p}=16$ mm. The periodicity of the finger portion is $N=28.7$ m$^{-1}$ and determines the periodicity of the cuts in the carrier.

The planar, flexible carrier consists of thermo-stabilized, 75 μm polyester foil. Thinner or thicker foil may be used without problem. This foil serves as a substrate for the polymer thick film (PTF) electrical heating circuit which is applied in three printing passes by flat bed or rotary screen printing. The parallel electrical circuit is applied using a highly conductive PTF silver for the feedlines and for heating, a low conductive PTF carbon black exhibiting positive temperature co-efficient of resistivity (PTCR) characteristics for heating, and finally a PTF dielectric overprint to ensure long-term stability against environmental and mechanical stress. FIG. 5 illustrates such a heating element.

The silver print exhibits a sheet resistance of 3 mOhm and the PTCR print of 2.4 kOhm at a temperature of 20° C. and for a hypothetical print thickness of 25 μm. Realized print thickness is typically between 5 and 15 μm. Prints are dried and cured in thermal processes at temperatures up to 150° C. for times no longer than 5 min. The dielectric print exhibits a thickness of up to 30 μm and is preferably UV cured after printing.

It is clear that other material than highly conductive PTF silver can be used to produce the highly conductive electrodes. Nanoparticle silver or galvanic copper would be used preferably.

The heating print may be composed of all kinds of graphite or carbon black (CB) PTF with or without PTCR characteristics. Any other print for instance comprising carbon nanotubes (CNTs), graphite flakes, conductive oxide, etc. could be used as well.

The printed and dried carrier, now comprising the electrical heating circuit, is cut according to the disclosed shape and is electrically contacted. Typical cutting processes are laser cutting or die cutting. Note that the electrical design makes use of the complete area of the carrier. Its maximum area is required in order to be able to place silver feedlines of great width and for achieving homogeneous temperature distribution.

Contacting is typically realized by crimping in case that the highly conductive feedlines are made of PTF. Contacting wires are preferably soldered in case that the highly conductive feedlines are purely metallic, (copper, e.g.). Some hotmelt (thermoplastic) is applied in the contact region to protect the contact against environmental and mechanical stresses.

Mounting the heating element on the steering wheel rim is realized by gluing the heating elements onto the rim where the contacted ends of the heating elements are positioned at the central spoke where feedthroughs for the cabling are foreseen. The heating elements are attached at the outer rim radius first and then all fingers/protrusions are successively attached.

Some polymer foam, typically PU foam, can be attached between the heating elements and the rim or/and the heating elements and the trim. Aim is to level possibly remaining unevenness of the trim, to distribute heat more uniform on the outside of the trim, and to modify the haptic of the steering wheel.

FIG. 5 represents a heating device for a steering wheel working with a parallel electrical circuit. The shape of the carrier is as disclosed in this document. Polyester foil as planar, flexible carrier, Silver print and CB based PTCR print. The heating element is designed to be operated with a voltage between 12 and 13.5 V and generates a power up to approx. 40 W per element. Two of these heating elements are needed to equip a steering wheel.

Embodiment 2: Heating Element Comprising a Serial Heating Circuit

A planar, flexible carrier which covers a maximum of the rim surface area supports a serial electrical heating circuit to create a heating element. This heating element is attached on the steering wheel rim.

The embodiment refers to a steering wheel comprising three finger portions and a steering wheel rim of approximately elliptical cross-section with dimensions $r_1=176$ mm, $r_{2r}=11$ mm, and $r_{2p}=16$ mm. The periodicity of the finger portion is $N=28.7$ m$^{-1}$ and determines the periodicity of the cuts in the carrier.

Figure 6:
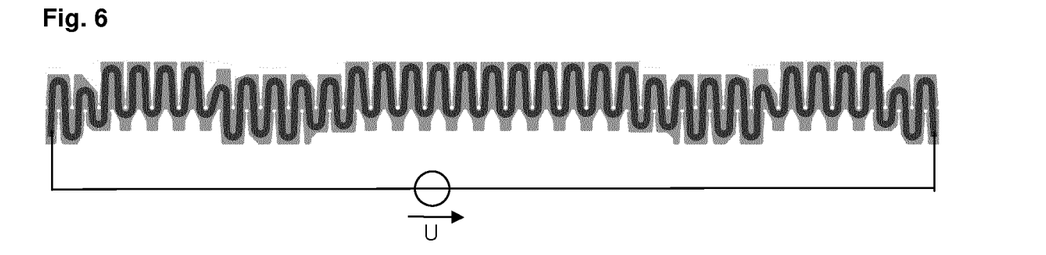
FIG. 6 is a top view of a further example of a heating device with a serial heating circuit.
Figure 7:
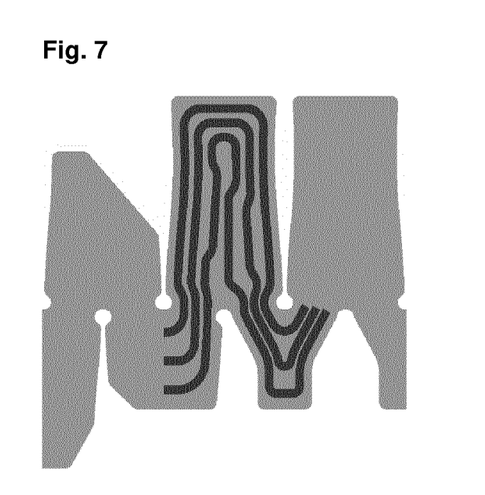
FIG. 7 is an enlarged detail of a variant of FIG. 6 showing three separate tracks instead of one conductive track.

The planar, flexible carrier consists of thermo-stabilized, 75 μm polyester foil. Thinner or thicker foil may be used without problem. This foil serves as a substrate for the polymer thick film (PTF) electrical heating circuit which is applied in two printing passes by flat bed or rotary screen printing. The serial electrical circuit is applied using a highly conductive PTF silver for preparation of highly conductive heating tracks and a PTF dielectric overprint to ensure long-term stability against environmental and mechanical stress. FIG. 6 schematically illustrates such a heating element. FIG. 7 presents details of the distribution of the highly conductive tracks on the carrier which yield high uniformity of the power distribution.

FIG. 6 represents a heating element for a steering wheel working with a serial electrical circuit. Shape of the carrier is as disclosed in this document. Gray: Polyester foil as planar, flexible carrier, Black: Silver print. The heating element is designed to be operated with a voltage U between 12 and 13.5 V and generates a power of approx. 80 W at on-board voltage U=12 V. One such heating element is needed to equip a steering wheel.

The silver print exhibits a sheet resistance of 1.8 mOhm for a hypothetical print thickness of 25 µm. Realized print thickness is typically between 5 and 15 µm. Prints are dried and cured in thermal processes at temperatures up to 150° C. for times no longer than 5 min. The dielectric print exhibits a thickness of up to 30 µm and is preferably UV cured after printing.

It is clear that other materials than highly conductive PTF silver can be used to produce the highly conductive electrodes. Nanoparticle silver (nanosilver) or galvanic copper would be used preferably. Dielectric lacquers may be used to protect the galvanic copper against oxidation.

The printed and dried carrier, now comprising the electrical heating circuit, is cut according to the disclosed shape and is electrically contacted. Typical cutting processes are laser cutting or die cutting. Note that the electrical design makes use of the complete area of the carrier. Its maximum area is required in order to be able to place silver tracks of great width and for achieving homogeneous temperature distribution.

Contacting is typically realized by crimping in case that the highly conductive heating tracks are made of PTF. Contacting wires are preferably soldered in case that the highly conductive heating tracks are purely metallic, (copper, e.g.). Some hotmelt (thermoplastic) is applied in the contact region to protect the contact against environmental and mechanical stresses.

Mounting the heating element on the steering wheel rim is realized by gluing the heating element onto the rim where the contacted ends of the heating element are positioned at the central spoke where feedthroughs for the cabling are foreseen. The heating element is attached at the outer rim radius first and then all fingers/protrusions are successively attached.

Some polymer foam, typically PU foam, can be attached between the heating element and the rim or/and the heating element and the trim. Aim is to level possibly remaining unevenness of the trim, to distribute heat more uniform on the outside of the trim, and to modify the haptic of the steering wheel.

FIG. 7 shows the detail of the heating element of FIG. 6. The width of the highly conductive track (black, as shown in FIG. 6) is split in three conductive tracks which exhibit smaller but equal width and equal length. In this way power uniformity across the heating element is increased. Gray: Section of the polyester foil as planar, flexible carrier.

Embodiment 3: Stretchable Planar Carrier

Embodiments 1 and 2 both base on planar, flexible carriers covering a maximum of the rim surface area. The covered surface area of the rim may be further increased and be even better connected by using a stretchable carrier. Stretchable shall mean that in a manual mounting process of the heating element on the steering wheel rim the operator may strain the heating element by up to 5% by hand along its long side.

Figure 8:
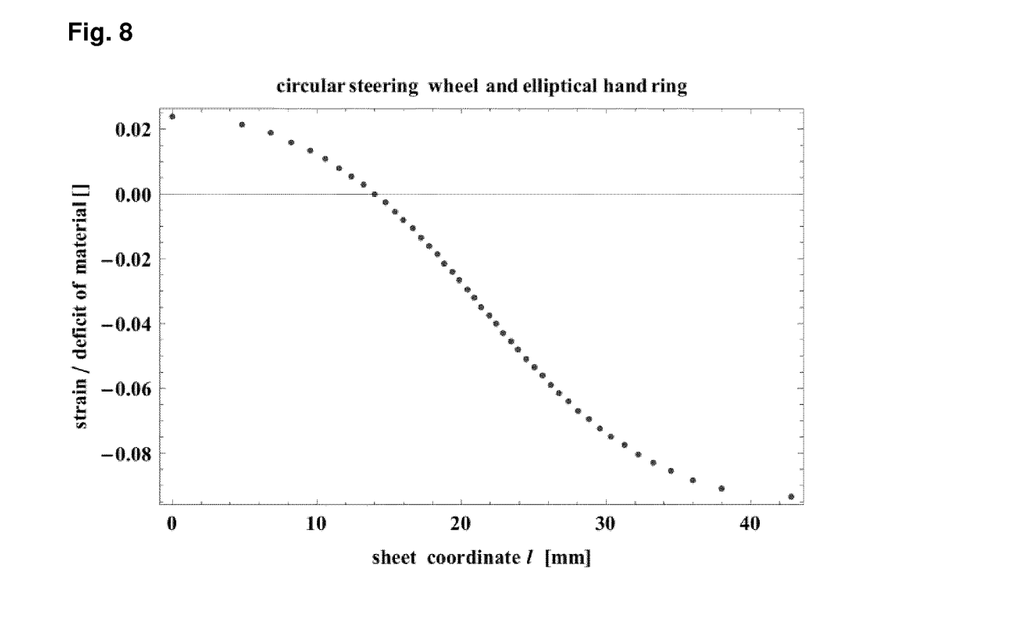
FIG. 8 is a graph illustrating the strain in a planar, stretchable carrier wrapped around a rim of elliptic cross-section as a function of carrier coordinate.

The stretchable foil is mounted on the outer radius of the rim under some pretension. Let this pretension be 2.4%, typical pretensions lie between 1 and 3%. When applying this pretension the neutral line shifts along the arc of the rim. Table 2 below lists the surplus of carrier material for different values of the arc length l. FIG. 8 presents the data of Tab. 2 in graphical form. FIG. 8 thus represents the strain in a planar, stretchable carrier wrapped around a rim of elliptic cross-section as a function of sheet (carrier) coordinate according to the data of Tab.2. Negative deficit of carrier material means surplus of carrier material. The carrier is pre-tensioned by 2.4% when mounted on the outer radius of the rim. The neutral line (strain=0) is approx. 14 mm away from the center line of the carrier.

Indeed, it can be seen that the (strain-free) neutral line lies at 13.98 mm away from the center (l=0), i.e. ε(13.98 mm)=0. In the carrier design the offset A (see FIG. 3) is chosen A=13.98 mm. Consequently a rectangle of L×27.96 mm² can be inscribed into the connected area of the carrier and hence is available for the application of even more powerful electrical heater designs of higher temperature uniformity than described in embodiments 1 and 2.

Note that the electrical designs of embodiments 1 and 2 can be applied on the carrier of embodiment 3 as well.

TABLE 2

Surplus of material for different values of the respective coordinate on a planar carrier (arc length l) for an elliptical cross-section of the rig ($r_1$ = 176 mm, $R_{2r}$ = 11 mm, and $r_{2p}$ = 16 mm). The carrier is pre-tensioned by 2.4% at the outer radius of the rim (arc length l = 0). The neutral line (ε = 0) lies at l = 13.98 mm.

| arc length l [mm] | strain/deficit of material |
| --- | --- |
| 0. | 0.02406 |
| 4.804 | 0.02139 |
| 6.766 | 0.01871 |
| 8.253 | 0.01604 |
| 9.492 | 0.01336 |
| 10.57 | 0.01069 |
| 11.54 | 0.008017 |
| 12.42 | 0.005343 |
| 13.23 | 0.00267 |
| 13.98 | 0 |
| 14.69 | −0.002678 |
| 15.36 | −0.005352 |
| 16. | −0.008026 |
| 16.61 | −0.0107 |
| 17.19 | −0.01337 |
| 17.76 | −0.01605 |
| 18.31 | −0.01872 |
| 18.84 | −0.02139 |
| 19.36 | −0.02407 |
| 19.88 | −0.02674 |
| 20.39 | −0.02942 |
| 20.89 | −0.03209 |
| 21.39 | −0.03476 |
| 21.89 | −0.03744 |
| 22.39 | −0.04011 |
| 22.9 | −0.04278 |
| 23.41 | −0.04546 |
| 23.93 | −0.04813 |
| 24.47 | −0.05081 |
| 25.02 | −0.05348 |
| 25.58 | −0.05615 |
| 26.17 | −0.05883 |
| 26.78 | −0.0615 |

TABLE 2-continued

Surplus of material for different values of the respective coordinate on a planar carrier (arc length l) for an elliptical cross-section of the rig ($r_1$ = 176 mm, $R_{2r}$ = 11 mm, and $r_{2p}$ = 16 mm). The carrier is pre-tensioned by 2.4% at the outer radius of the rim (arc length l = 0). The neutral line (ε = 0) lies at l = 13.98 mm.

| arc length l [mm] | strain/deficit of material |
| --- | --- |
| 27.41 | −0.06418 |
| 28.08 | −0.06685 |
| 28.79 | −0.06952 |
| 29.55 | −0.0722 |
| 30.36 | −0.07487 |
| 31.24 | −0.07754 |
| 32.2 | −0.08022 |
| 33.28 | −0.08289 |
| 34.52 | −0.08557 |
| 36.01 | −0.08824 |
| 37.97 | −0.09091 |
| 42.78 | −0.09359 |

The invention claimed is:

1. A planar carrier for mounting on a rim of a steering wheel without wrinkles, the planar carrier comprising a portion of planar flexible foil having two longitudinal sides and two lateral sides, wherein a length B of the lateral sides is 0.96 to 1.00 times a perimeter of the rim, wherein N cut-outs per unit length are provided on each of the longitudinal sides, and wherein the N cut-outs on one of the two longitudinal sides are arranged in a staggered fashion relative to opposing N cut-outs on the opposite longitudinal side and wherein a width of each of the N cut-outs on the longitudinal sides as a function of an arc length l of the rim, w(l), is $$w(l) = \frac{\varepsilon(l)}{N}$$

wherein ε(l) is a material surplus of the planar flexible foil as a function of the arc length l of the rim, and the arc length l of the rim is measured from a middle (B/2) of the planar flexible foil in perpendicular direction to the longitudinal sides, N being chosen between 10 and 50 m$^{-1}$, wherein arc length l of the rim as a function of a radial coordinate r is $$l(r) = \int_r^{r_1+r_{2r}} \sqrt{\left(\frac{df(r)}{dr}\right)^2 + 1} \, dr$$

wherein $r_1$ is a radius of the steering wheel, $r_{2r}$ is a radius of the rim collinear with $r_1$, f(r) is a function describing a cross-sectional shape of the rim, and wherein the material surplus of the planar flexible foil in the planar carrier as a function of the radial coordinate r is $$\varepsilon(r) = \frac{\Delta l(r)}{l} = -1 + \frac{r}{r_1+r_{2r}}$$

and wherein, when the rim of the steering wheel has a circular cross-section, the width of each of the N cut-outs on the longitudinal sides as a function of the arc length l of the rim, w(l), is $$w(l) = \left(-1 + \frac{r_1 + r_{2r}\cos\left[\frac{l}{r_{2r}}\right]}{r_1+r_{2r}}\right) \cdot N^{-1}.$$

2. The planar carrier as claimed in claim 1, wherein, when the rim of the steering wheel includes finger portions, the width of the N cut-outs on one of the longitudinal sides are enlarged relative to w(l).

3. The planar carrier as claimed in claim 1, wherein the planar flexible foil is stretchable when the rim of the steering wheel includes finger portions.

4. The planar carrier as claimed in claim 1, wherein the planar carrier is stretchable and a length of the planar carrier is chosen to be up to 5% shorter than an outer perimeter of the rim.

5. The planar carrier as claimed in claim 1, wherein the planar carrier comprises one or more layers of polymer film, elastomer foils, textile, or any combination thereof.

6. A heat carrier comprising a planar carrier according to claim 1, wherein the planar carrier is configured to distribute heat from an external source through a cross-section of the planar carrier.

7. A heating device for a steering wheel, comprising a planar carrier according to claim 1, and at least one heating element arranged on at least one side of the planar carrier, wherein the at least one heating element comprises at least one electrical heating circuit.

8. The heating device as claimed in claim 7, wherein the at least one electrical heating circuit is a serial or parallel electrical heating circuit.

9. The heating device as claimed in claim 7, wherein the at least one electrical heating circuit comprises conductive materials selected from at least one of printed polymer thick film (PTF) silver, printed nanosilver and galvanic copper.

10. The heating device as claimed in claim 7, further comprising at least one dielectric layer between the planar carrier and the at least one heating element.

11. A method for producing a planar carrier for a steering wheel according to claim 1, the method comprising the steps of:
 (a) determining an outer diameter and the cross-sectional shape of the rim to be equipped with the planar carrier,
 (b) determining N, the number of cut-outs per unit length,
 (c) determining a size of the planar flexible foil based at least in part on the outer diameter of the rim,
 (d) preparing the planar carrier for mounting on the rim of the steering wheel, and
 (e) providing said portion of planar flexible foil owith the N cut-outs.

12. A method for producing a heating device, a sensing device, or both, for a steering wheel as claimed in claim 7, comprising the steps of:
 (a) determining an outer diameter and the cross-sectional shape of the rim to be equipped with the planar carrier,
 (b) determining N, the number of cut-outs per unit length,
 (c) determining a size of the planar flexible foil based at least in part on the outer diameter of the rim,
 (d) preparing the planar carrier for mounting on the rim of the steering wheel,
 (e) providing said portion of planar flexible foil with the N cut-outs, and (f) arranging at least one heating element on at least one side of the planar carrier.

13. A method of using a planar carrier as claimed in claim 1, comprising the step of applying the planar carrier to the rim of the steering wheel, wherein the coverage of the rim is at least 86% of the surface of the rim without wrinkles for steering wheels with finger portions and at least 96% of the surface of the rim without wrinkles for steering wheels without finger portions.

14. A method of using a planar carrier as claimed in claim 1, comprising the step of applying the planar carrier to the rim of the steering wheel for capacitive sensing of the presence of a driver's hand(s) on the steering wheel.

15. The planar carrier as claimed in claim 1, wherein N is between 20 and 40 $m^{-1}$.

16. A sensing device for a steering wheel, comprising a planar carrier according to claim 1, and at least one sensing element arranged on at least one side of the planar carrier, wherein the at least one sensing element comprises at least one sensing circuit.

17. The sensing device as claimed in claim 16, wherein the at least one sensing circuit is a serial or parallel electrical sensing circuit.

18. The sensing device as claimed in claim 16, wherein the at least one sensing circuit comprises conductive materials selected from at least one of printed polymer thick film (PTF) silver, printed nanosilver and galvanic copper.

19. The sensing device as claimed in claim 16, further comprising at least one dielectric layer between the planar carrier and the at least one sensing element.

\* \* \* \* \*